US009451603B2

(12) United States Patent
Mu et al.

(10) Patent No.: US 9,451,603 B2
(45) Date of Patent: Sep. 20, 2016

(54) INFORMATION TRANSMISSION METHOD, INFORMATION TRANSMISSION APPARATUS, AND BASE STATION

(71) Applicant: NTT DoCoMo, Inc., Tokyo (JP)

(72) Inventors: Qin Mu, Beijing (CN); Liu Liu, Beijing (CN); Lan Chen, Beijing (CN); Hidetoshi Kayama, Beijing (CN); Kazuaki Takeda, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 117 days.

(21) Appl. No.: 14/056,313

(22) Filed: Oct. 17, 2013

(65) Prior Publication Data
US 2014/0112268 A1    Apr. 24, 2014

(30) Foreign Application Priority Data

Oct. 19, 2012  (CN) .......................... 2012 1 0401566

(51) Int. Cl.
| | |
|---|---|
| *H04W 72/04* | (2009.01) |
| *H04L 5/14* | (2006.01) |
| *H04W 88/04* | (2009.01) |
| *H04W 88/08* | (2009.01) |

(52) U.S. Cl.
CPC .............. *H04W 72/042* (2013.01); *H04L 5/14* (2013.01); *H04W 72/0446* (2013.01); *H04W 88/04* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2009/0262692 | A1* | 10/2009 | Olszewski | ............ H04L 5/0007 370/329 |
| 2010/0157896 | A1* | 6/2010 | Kim | ........................ H04L 25/24 370/328 |
| 2010/0220683 | A1* | 9/2010 | Novak | .................. H04L 5/0044 370/330 |

(Continued)

FOREIGN PATENT DOCUMENTS

| | | |
|---|---|---|
| CN | 102395206 | 3/2012 |
| EP | 2779768 | 9/2014 |

(Continued)

OTHER PUBLICATIONS

NTT DoCoMO, "Design Principles for ePDCCH Multiplexing", R1-123551, 3GPP TSG RAN WG1, Meeting #70, Qindao, China, Aug. 13-17, 2012; 4 pages.

(Continued)

*Primary Examiner* — Jeffrey M Rutkowski
*Assistant Examiner* — Jonathan B Wood
(74) *Attorney, Agent, or Firm* — Harness, Dickey & Pierce, P.L.C.

(57) ABSTRACT

The present application provides an information transmission method, an information transmission apparatus, and a base station. The information transmission method comprises: an allocation step of, according to a search space allocation mode, performing search space allocation in a target resource consisting of at least two resource subsets and allocating, for the first user, a first search space capable of transmitting the first user control information, the search space allocation mode being associated with the at least two resource subsets; and a first transmission step of transmitting the first user control information via the first search space so that the first user can acquire the first user control information from the first search space according to the search space allocation mode. According to the present invention, the resource utilization efficiency will be improved.

20 Claims, 9 Drawing Sheets

(56) References Cited

U.S. PATENT DOCUMENTS

| | | | | |
|---|---|---|---|---|
| 2010/0254329 A1* | 10/2010 | Pan | H04L 5/001 | 370/329 |
| 2010/0278106 A1* | 11/2010 | Kim | H04L 5/0007 | 370/328 |
| 2011/0267994 A1* | 11/2011 | Pan | H04W 52/08 | 370/280 |
| 2011/0269492 A1* | 11/2011 | Wang | H04L 5/003 | 455/509 |
| 2012/0008586 A1* | 1/2012 | Kwon | H04L 5/0053 | 370/329 |
| 2012/0039170 A1* | 2/2012 | Ball | H04L 5/0007 | 370/230 |
| 2012/0093112 A1* | 4/2012 | Qu | H04L 5/001 | 370/329 |
| 2012/0114021 A1* | 5/2012 | Chung | H04B 7/155 | 375/211 |
| 2012/0157108 A1* | 6/2012 | Boudreau | H04W 16/32 | 455/450 |
| 2012/0163437 A1* | 6/2012 | Frederiksen | H04L 5/001 | 375/224 |
| 2012/0198077 A1* | 8/2012 | Wei | H04L 5/006 | 709/226 |
| 2012/0236814 A1* | 9/2012 | Nishio | H04L 5/001 | 370/329 |
| 2013/0003672 A1* | 1/2013 | Dinan | H04L 1/00 | 370/329 |
| 2013/0016653 A1* | 1/2013 | Kim | H04W 72/042 | 370/315 |
| 2013/0021948 A1* | 1/2013 | Moulsley | H04W 24/02 | 370/254 |
| 2013/0039284 A1* | 2/2013 | Marinier | H04L 5/001 | 370/329 |
| 2013/0051342 A1* | 2/2013 | Aiba | H04L 1/1893 | 370/329 |
| 2013/0083750 A1* | 4/2013 | Nazar | H04L 5/0055 | 370/329 |
| 2013/0114419 A1* | 5/2013 | Chen | H04L 5/0053 | 370/248 |
| 2013/0121295 A1* | 5/2013 | Saito | H04L 5/001 | 370/329 |
| 2013/0148593 A1* | 6/2013 | Suzuki | H04L 5/0051 | 370/329 |
| 2013/0188566 A1* | 7/2013 | Zhu | H04W 72/042 | 370/329 |
| 2013/0229957 A1* | 9/2013 | Sartori | H04W 72/04 | 370/281 |
| 2013/0272171 A1* | 10/2013 | Zhang | H04L 5/0037 | 370/280 |
| 2014/0056220 A1* | 2/2014 | Poitau | H04W 40/246 | 370/328 |
| 2014/0056279 A1* | 2/2014 | Chen | H04W 52/04 | 370/330 |
| 2014/0086184 A1* | 3/2014 | Guan | H04W 72/1289 | 370/329 |
| 2014/0105157 A1* | 4/2014 | Yang | H04L 5/001 | 370/329 |
| 2014/0105162 A1* | 4/2014 | Li | H04W 72/042 | 370/329 |
| 2014/0146768 A1* | 5/2014 | Seo | H04L 5/001 | 370/329 |
| 2014/0153515 A1* | 6/2014 | Chun | H04L 5/0007 | 370/329 |
| 2014/0169316 A1* | 6/2014 | Kim | H04L 5/0048 | 370/329 |
| 2014/0169324 A1* | 6/2014 | Seo | H04L 5/001 | 370/329 |
| 2014/0233470 A1* | 8/2014 | Kim | H04L 1/0046 | 370/329 |
| 2014/0286297 A1 | 9/2014 | Zhao et al. | | |
| 2014/0293942 A1* | 10/2014 | Kang | H04L 5/0053 | 370/329 |

FOREIGN PATENT DOCUMENTS

| | | |
|---|---|---|
| KR | 20140093261 | 7/2014 |
| WO | 2013067845 | 5/2013 |

OTHER PUBLICATIONS

NTT DoCoMO, "Search Space Design for ePDCCH Transmission Schemes", R1-122899, 3GPP TSG RAN WG1, Meeting #69, Prague, Czech Republic, May 21-25, 2012; 6 pages.

NTT DoCoMO, "Configuration of PRB Pairs for ePDCCH", R1-123555, 3GPP TSG RAN WG1, Meeting #70, Qingdao, China, Aug. 13-17, 2012; 4 pages.

NTT DoCoMo, Performance Evaluation of Search Space for ePDCCH, R1-123552, 3GPP TSG RAN WG1, Meeting #70, Qingdao, China, Aug. 13-17, 2012; 6 pages.

Research in Motion, UK Limited, "On Remaining Issues in E-PDCCH Search Space Design", R1-124245, 3GPP TSG RAN WG1, Meeting #70bis, San Diego, US, Oct. 8-12, 2012, 8 pages.

Research in Motion, UK Limited. "Support Common Control Channel in E-PDCCH", R1-121479, 3GPP TSG RAN WG1, Meeting #68bis, Jeju, Korea, Mar. 26-30, 2012, 6 pages.

Extended European Search Report in corresponding European application 13189101.2, Nov. 13, 2014, 13 pages.

* cited by examiner

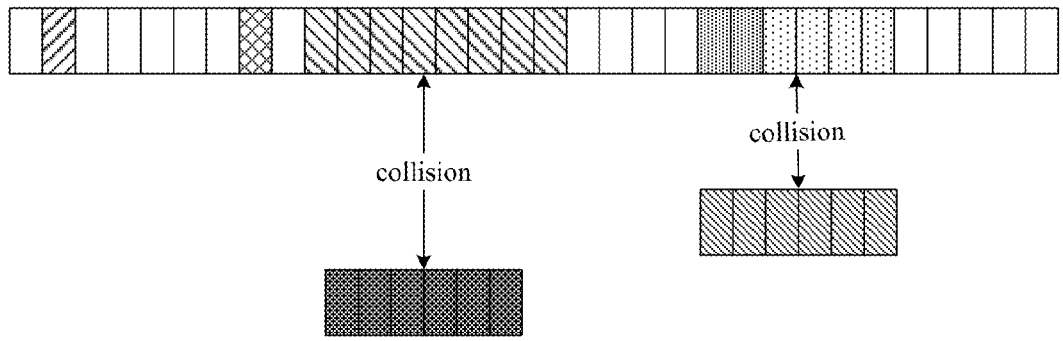

Fig. 5

| 601 | an allocation step of, according to a search space allocation mode, performing search space allocation in a target resource consisting of at least two resource subsets and allocating, for the first user, a first search space capable of transmitting the first user control information |

↓

| 602 | a first transmission step of transmitting the first user control information via the first search space so that the first user can acquire the first user control information from the first search space according to the search space allocation mode |

Fig. 6

INFORMATION TRANSMISSION METHOD, INFORMATION TRANSMISSION APPARATUS, AND BASE STATION

CROSS-REFERENCE TO RELATED APPLICATIONS

The present application claims priority to Chinese Patent Application No. 201210401566.6 filed before the Chinese Patent Office on Oct. 19, 2012 and entitled "INFORMATION TRANSMISSION METHOD, INFORMATION TRANSMISSION APPARATUS, AND BASE STATION", which is incorporated herein by reference in its entirety.

TECHNICAL FIELD

The present invention relates to the field of mobile communication technology, in particular to an information transmission method, an information transmission apparatus, and a base station.

BACKGROUND

Along with the development of mobile communication technologies, more and more new technologies, such as Multi-User Multiple Input Multiple Output (MU-MIMO), heterogeneous network (HetNet) and New Carrier Type (NCT), are introduced into a communication system so as to improve the performance thereof, and these technologies rely heavily on Physical Downlink Control Channel (PDCCH). The wide application of these technologies will lead to a shortage of PDCCH capacity. In order to solve this problem, Enhanced Physical Downlink Control Channel (ePDCCH) is introduced so as to expand the PDCCH capacity.

FIG. 1 shows a basic framework of ePDCCH. An ePDCCH domain and Physical Downlink Shared Channel (PDSCH) are multiplexed in frequency division multiplexing manner to support interference coordination. A base station configures the resource for ePDCCH domain via RRC signaling. In addition, ePDCCH performs data demodulation based on DM-RS, so it can obtain a gain via beam-forming. For ePDCCH, it is one of the core designs to design a search space in the ePDCCH domain.

For PDCCH, all users in a cell will monitor an identical control domain. Blind detection is performed by each user in the control domain so as to determine whether or not there is PDCCH transmitted from the base station to the user in the control domain. Search space is introduced so as to reduce the times of blind detection at a user end. Briefly, search space is a series of potential PDCCH positions, the number of which depends on the size of control information, as shown in FIG. 2. The base station and the user allocate the search space resources according to a Hashing function.

For ePDCCH, because it occupies the PDSCH resources, not only a traditional index, e.g., collision probability, but also a resource utilization efficiency shall be taken into consideration when performing the corresponding search space design.

Recently, several search space designs have been presented. The most direct and simplest way is to perform search space allocation with a Hashing function in all the ePDCCH domains configured by the base station. However, a shortcoming of such way is that the resource utilization efficiency is relatively low when there are few users. In order to improve the resource utilization efficiency, a method of dynamically informing the resources is presented. In this method, the base station tries at first to perform the search space allocation with a Hashing function in a part of the configured resources, tries again to perform the search space allocation in more resources if there is an ePDCCH collision, until no ePDCCH collision occurs or all the configured resources have been used up. Then, the base station will inform the user of the resources actually used via dynamic information (via ePCFICH), and the remaining configured resources may be multiplexed as PDSCH so as to improve the resource utilization efficiency, as shown in FIG. 3.

However, such a search space allocation mode is still inflexible, and the resource utilization efficiency is still low. For example, as shown in FIG. 4, the method of the prior art tries at first to perform the search space allocation in the resources corresponding to "00", then in the resources corresponding to "01" if there is an ePDCCH collision, and then in the resources corresponding to "10" if there is still the ePDCCH collision. As a result, the resources corresponding to "01", other than the resources corresponding to "00", will be wasted. In addition, actually only a part of the resources corresponding to "10", other than those corresponding to "01", is allocated for transmitting user control information, and the others will be wasted too.

SUMMARY

An object of an embodiment of the present invention is to provide an information transmission method, an information transmission apparatus, and a base station, so as to improve a resource utilization efficiency.

An embodiment of the present invention provides an information transmission method for enabling a base station to transmit first user control information of a first user on an Enhanced physical downlink control channel (ePDCCH), the information transmission method comprising:

an allocation step of, according to a search space allocation mode, performing a search space allocation in a target resource consisting of at least two resource subsets and allocating, for the first user, a first search space capable of transmitting the first user control information, the search space allocation mode being associated with the at least two resource subsets; and a first transmission step of transmitting the first user control information via the first search space so that the first user can acquire the first user control information from the first search space according to the search space allocation mode.

Preferably, the allocation step specifically comprises:

a pre-allocation step of, according to the search space allocation mode, performing the search space allocation in a current target resource consisting of at least two resource subsets, to obtain an allocation result;

a judgment step of, according to the allocation result, judge whether or not the first search space currently allocated for the first user can transmit the first user control information, to obtain a judgment result; and an execution step of, when the judgment result is yes, proceeding to the first transmission step, and otherwise updating the current target resource by allocating new resources from the unallocated resources as new resource subsets, and then performing the search space allocation again.

Preferably, a correspondence between the resource subset and a size of the user control information is recorded in the search space allocation mode. The pre-allocation step specifically comprises:

according to the correspondence between the resource subset and the size of the user control information, determining a first resource subset corresponding to a size of the first user control information from the at least two resource subsets; and performing the search space allocation in the first resource subset, to obtain the allocation result.

Preferably, the search space allocation mode includes a search space partitioning mode as well as a correspondence between a search position subset and a resource subset. The pre-allocation step specifically comprises:

according to the search space partitioning mode, partitioning a current potential search position set into a plurality of first potential search position subsets;

according to the correspondence between the search position subset and the resource subset, selecting the first resource subsets corresponding to the first potential search position subsets from the current target resource;

performing the allocation in the first resource subsets respectively, to obtain a first search subspace corresponding to each of the first resource subsets; and combining all the first search subspaces into the allocation result.

Preferably, the number of the search subspaces is less than or equal to the number of the selected resource subsets.

Preferably, the search space allocation mode is pre-stored in the base station and a user equipment (UE).

Preferably, the information transmission method further comprises:

a second transmission step of acquiring the search space allocation mode used when the base station allocates the first search space, and informing the first user of the search space allocation mode.

Preferably, in the second transmission step, the first user is informed of the search space allocation mode via a RRC signaling.

In another aspect, an embodiment of the present invention further provides an information transmission apparatus for enabling a base station to transmit first user control information of a first user on an Enhanced physical downlink control channel (ePDCCH), the information transmission apparatus comprising:

an allocation module configured to, according to a search space allocation mode, perform a search space allocation in a target resource consisting of at least two resource subsets and allocate, for the first user, a first search space capable of transmitting the first user control information, the search space allocation mode being associated with the at least two resource subsets; and a first transmission module configured to transmit the first user control information via the first search space so that the first user can acquire the first user control information from the first search space according to the search space allocation mode.

Preferably, the allocation module specifically comprises:

a pre-allocation unit configured to, according to the search space allocation mode, perform the search space allocation in a current target resource consisting of at least two resource subsets, to obtain an allocation result;

a judgment unit configured to, according to the allocation result, judge whether or not the first search space currently allocated for the first user can transmit the first user control information, to obtain a judgment result; and an execution unit configured to, when the judgment result is yes, trigger the first transmission module to transmit the first user control information, and otherwise update the current target resource by allocating new resources from the unallocated resources as new resource subsets, and then trigger the pre-allocation unit to perform the search space allocation.

Preferably, a correspondence between the resource subset and a size of the user control information is recorded in the search space allocation mode. The pre-allocation unit specifically comprises:

a determination sub-unit configured to, according to the correspondence between the resource subset and the size of the user control information, determine a first resource subset corresponding to a size of the first user control information from the at least two resource subsets; and an acquisition sub-unit configured to perform the search space allocation in the first resource subset, to obtain the allocation result.

Preferably, the search space allocation mode includes a search space partitioning mode as well as a correspondence between a search position subset and a resource subset. The pre-allocation unit comprises:

a partition sub-unit configured to, according to the search space partitioning mode, partition a current potential search position set into a plurality of first potential search position subsets;

a selection sub-unit configured to, according to the correspondence between the search position subset and the resource subset, select the first resource subset corresponding to the first potential search position subsets from the current target resource;

an allocation sub-unit configured to perform the allocation in the first resource subsets respectively, to obtain a first search subspace corresponding to each of the first resource subsets; and a combining sub-unit configured to combine all the first search subspaces into the allocation result.

Preferably, the information transmission apparatus further comprises:

a second transmission module configured to acquire the search space allocation mode used when the base station allocates the first search space, and inform the first user of the search space allocation mode.

In yet another aspect, the present invention further provides a base station comprising the above-mentioned information transmission apparatus.

The present application at least has the following beneficial effect.

According to the search space allocation mode, the search space is allocated for the user in the target resource consisting of at least two resource subsets, and the corresponding user control information is transmitted via the allocated search space. As a result, it is able to improve the resource utilization efficiency and meanwhile reduce the collision probability when the search space is allocated for the user.

BRIEF DESCRIPTION OF THE DRAWINGS

FIG. 5 shows a problem 2 existing in the dynamic method, i.e., that the collision probability needs to be improved;

FIG. 6 is a flow chart of an information transmission method according to an embodiment of the present invention;

DETAILED DESCRIPTION

Figures 1, 2:
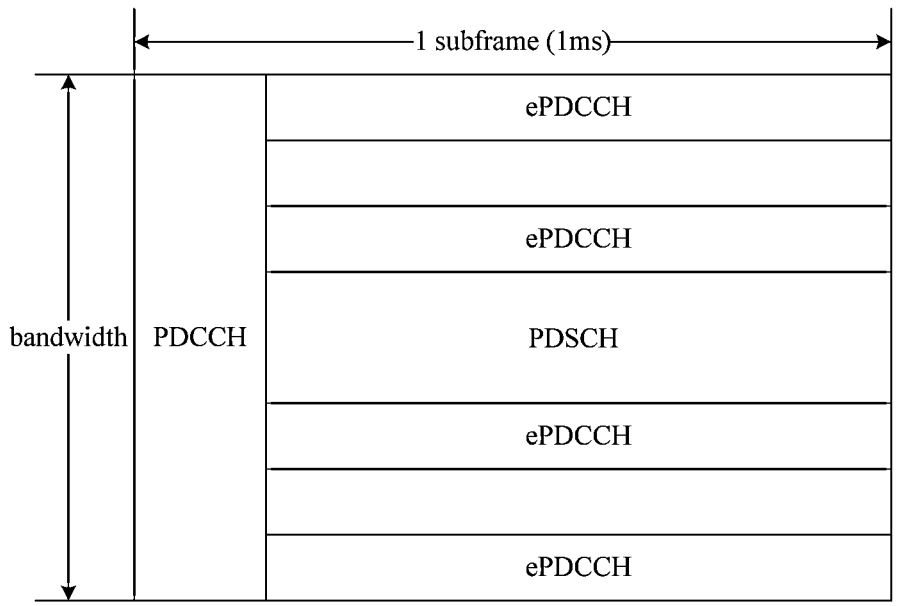
FIG. 1 shows a basic framework of ePDCCH.
FIG. 2 shows a correspondence between the number of potential positions and a size of PDCCH.

To make the objects, the technical solutions and the advantages of the present invention more apparent, the present invention is described hereinafter in conjunction with the drawings as well as embodiments.

FIG. 6 is a flow chart of an information transmission method according to an embodiment of the present invention. Referring to FIG. 6, the present invention provides an information transmission method for enabling a base station to transmit first user control information of a first user on an Enhanced physical downlink control channel (ePDCCH), the information transmission method comprises:

Step 601: according to a search space allocation mode, performing search space allocation in a target resource consisting of at least two resource subsets and allocating, for the first user, a first search space capable of transmitting the first user control information, the search space allocation mode being associated with the at least two resource subsets; and Step 602: transmitting the first user control information via the first search space so that the first user can acquire the first user control information from the first search space according to the search space allocation mode.

It can therefore be seen that, according to the search space allocation mode, the search space is allocated for the user in the target resource consisting of at least two resource subsets, and the corresponding user control information is transmitted via the allocated search space. As a result, the resource utilization efficiency can be improved.

As can be seen in Steps 601 and 602, the mode of performing the search space allocation is identical to the search space allocation mode in which the first user acquires the first user control information, and the search space allocation mode may be provided in various ways.

Way 1

In this way, the search space allocation mode is pre-stored in the base station and a UE. At this time, the base station and the UE can determine the search space according to the same search space allocation mode.

Way 2

In way 1, the search space allocation mode is pre-stored in the base station and the UE, but this way is inflexible. To solve this problem, in way 2, the base station informs the UE of the search space allocation mode via a signaling, such as a RRC signaling.

In this way, the information transmission method further comprises:

a second transmission step of acquiring the search space allocation mode used when the base station allocates the first search space, and informing the first user of the search space allocation mode.

In an embodiment of the present invention, the second transmission step may inform the first user of the search space allocation mode via the RRC signaling.

In an embodiment of the present invention, Step 601 may be implemented by the following steps:

a pre-allocation step of, according to the search space allocation mode, performing search space allocation in a current target resource consisting of at least two resource subsets, to obtain an allocation result;

a judgment step of, according to the allocation result, judge whether or not the first search space currently allocated for the first user can transmit the first user control information, to obtain a judgment result; and an execution step of, when the judgment result is yes, proceeding to the first transmission step, and otherwise updating the current target resource by allocating new resources from the unallocated resources as new resource subsets, and then performing the search space allocation again.

In an embodiment of the present invention, when the search space allocation is performed in the target resource in which the search space allocation is currently required to be performed, the target resource may be divided into a plurality of resource subsets.

The search space may be allocated in two search space allocation modes.

Search Space Allocation Mode 1

In this mode, the allocated search space may consist of at least two search subspaces, and different search sub-spaces correspond to different resource subsets.

In this mode, the search space allocation mode may comprise a search space partitioning mode as well as a correspondence between a search position subset and a resource subset. The pre-allocation step specifically comprises:

according to the search space partitioning mode, partitioning a current potential search position set into a plurality of first potential search position subsets;

according to the correspondence between the search position subset and the resource subset, selecting the first resource subsets corresponding to the first potential search position subsets from the current target resource;

performing the allocation in the first resource subsets respectively, to obtain a first search subspace corresponding to each of the first resource subsets; and combining all the first search subspaces into the allocation result.

In this mode, the potential search position sets in the allocated search space are dispersed into the plurality of resource subsets, so as to reduce the collision probability of ePDCCH in the case of given resources, and to improve the resource utilization efficiency of ePDCCH.

Further, the number of the search subspaces is less than or equal to the number of the selected resource subsets.

Search Space Allocation Mode 2

In this mode, the user control information corresponding to different resource subsets is of different sizes.

To be specific, a correspondence between a resource subset and a size of the user control information is recorded in the search space allocation mode. The pre-allocation step comprises:

according to the correspondence between the resource subset and the size of the user control information, determining a first resource subset corresponding to a size of the first user control information from the at least two resource subsets; and performing the search space allocation in the first resource subset, to obtain the allocation result.

In this mode, with respect to the ePDCCH configurations for the user with the user control information of a small size, there will be no collision when the resources are occupied by the user with the user control information of a large size. In the case of a given number of the users configured with ePDCCH, it is unnecessary to perform the resource allocation in more resources, so it is able to save the resources and improve the resource utilization efficiency.

Through the above-mentioned two search space allocation modes, the resource utilization efficiency of ePDCCH may be improved due to the gains produced by dividing the resource, which is used to allocate the search space for the user, into at least two resource subsets. Hence, any search space allocation mode that meets the requirements of Steps 601 and 602 can improve the resource utilization efficiency of ePDCCH.

On the other hand, one factor of improvement of the resource utilization efficiency of ePDCCH is that the collision probability is reduced in the case of given resources.

To make the present invention more apparent, a first preferred embodiment of the information transmission method is provided based on the search space allocation mode 1, and a second preferred embodiment of the information transmission method is provided based on the search space allocation mode 2.

First Preferred Embodiment

Figure 7:
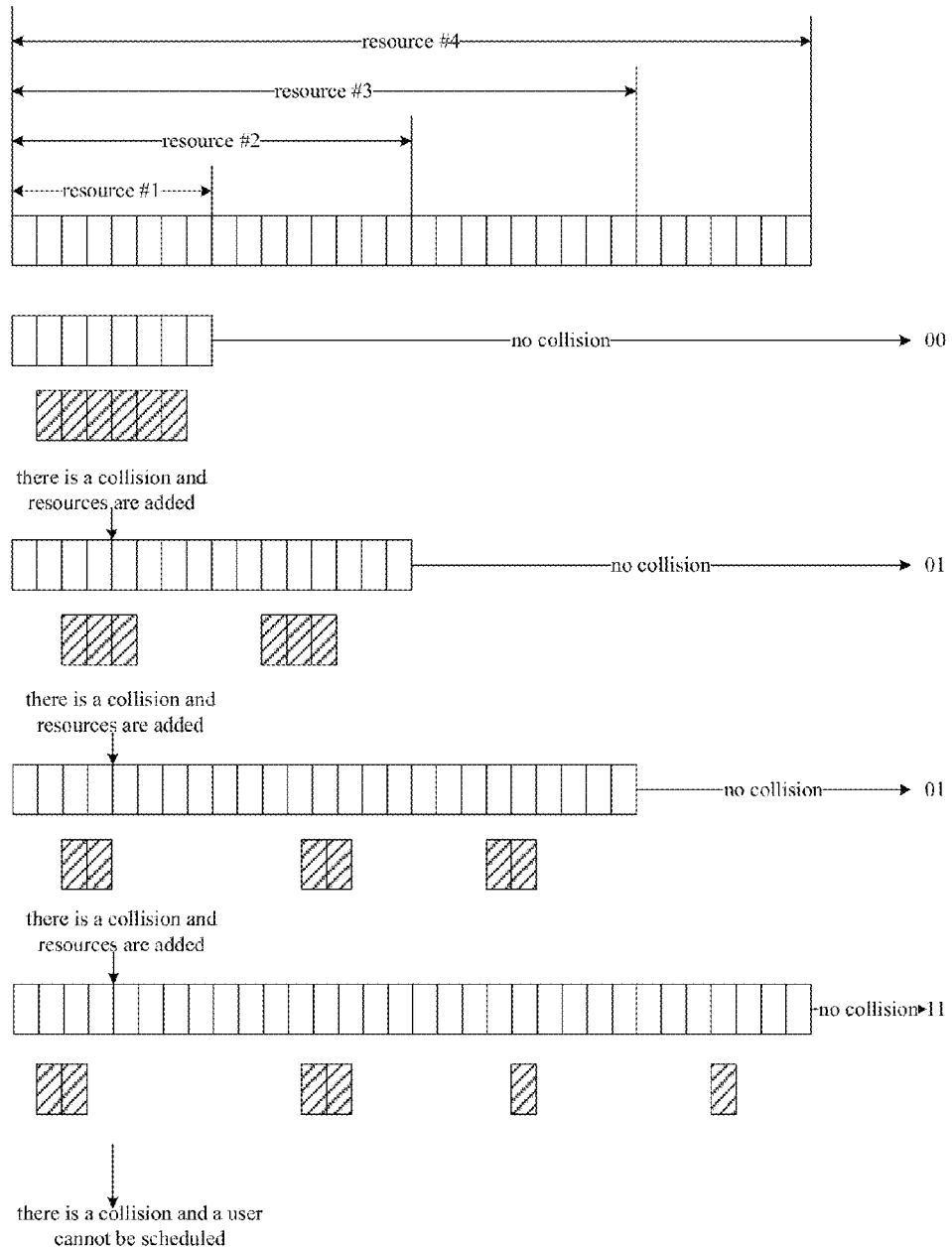
FIG. 7 is a schematic view showing a basic implementation mechanism according to a preferred embodiment of the present invention.

FIG. 7 is a schematic view showing a basic implementation mechanism according to the first preferred embodiment. Referring to FIG. 7, when the base station transmits the user control information of a user on ePDCCH, it is necessary to allocate the search space for the user in a given target resource. The base station and the UE use an identical allocation algorithm for allocating the search space in the given target resource, e.g., Hashing function. After the base station determines the search space where no ePDCCH collision will occur, it informs the UE of the target resource for the search space, so as to support the UE to determine the search space in the informed target resource using the allocation algorithm identical to that used by the base station, thereby to perform blind detection on ePDCCH in the search space.

When the target resource is resource #2, the at least two resource subsets include resource #1 and the resources in resource #2 other than resource #1. If there is no collision, the base station will transmit ePCFICH indicating "01" to the UE, and if there is a collision, it will extend the target resource to resource#3.

When the target resource is resource #3, the at least two resource subsets include resource #1, the resources in resource #2 other than resource #1, and the resources in resource #3 other than resource #2. If there is no collision, the base station will transmit ePCFICH indicating "10" to the UE, and if there is a collision, it will extend the target resource to resource #4.

When the target resource is resource #4, the at least two resource subsets include resource #1, the resources in resource #2 other than resource #1, the resources in resource #3 other than resource #2, and the resources in resource #4 other than resource #3. If there is no collision, the base station will transmit ePCFICH indicating "11" to the UE.

As can be seen in FIG. 7, in the search space allocation mode 1, when the number of the at least two resource subsets is large, the number of the first potential search position subsets obtained by partitioning the current potential search position set will be large too. To be specific, in FIG. 7, the number of the first potential search position subsets is identical to the number of the at least two resource subsets.

Based on the basic implementation mechanism, this preferred embodiment comprises the following steps.

Step 701: when the base station tries to perform the search space allocation on a part of the configuration resources, partitioning the part of the configuration resources into several subsets. Different number of resources may be partitioned into different number of subsets. The relationship between the number of the subsets and the number of resources may be determined on the basis of dynamic information, as shown in Table 1. For example, when the dynamic information is 01, the resources corresponding to 01 will be partitioned into two subsets.

TABLE 1 relationship between the number of subsets and the number of resources

| dynamic information | the number of subsets to be partitioned |
|---|---|
| 00 | 1 |
| 01 | 2 |
| 10 | 3 |
| 11 | 4 |

Step 702: partitioning, by the base station, the search space on different subsets. When the number of the resources is different, the number of the subsets will be different, so the partition of the search space on different number of resources will be different too. One mode is to partition the potential positions with the same aggregation level onto different subsets, as shown in Table 2. Taking that the dynamic information is 10 and the aggregation level is 4 as an example, the mode of partitioning the search space is that the potential search position set corresponds to two potential search position subsets, and the number of the potential search positions in each potential search position subset is 1; the correspondence between the search position subset and the resource subset is that two potential search position subsets correspond to a resource subset Set 1 and a resource subset Set 3 respectively.

Figure 4:
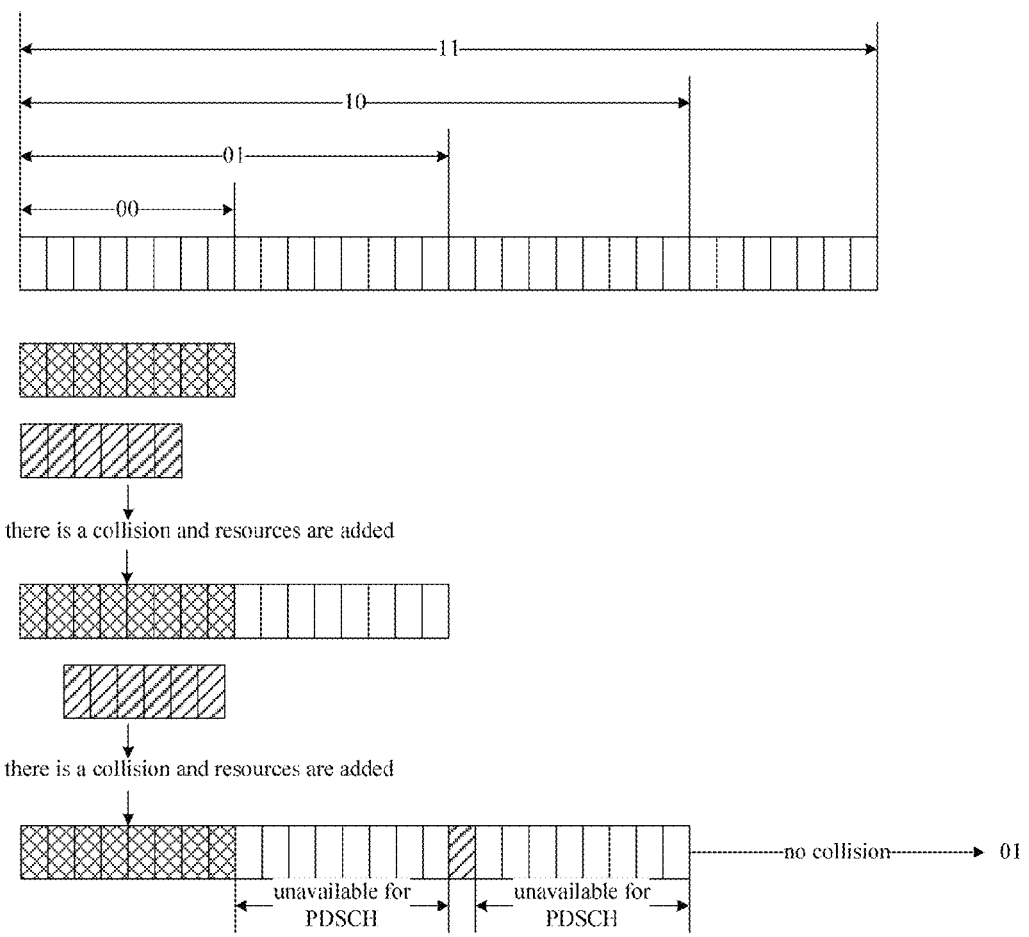
FIG. 4 shows a problem 1 existing in the dynamic method, i.e., that there is still room for the improvement of the resource utilization efficiency.
Figure 8:
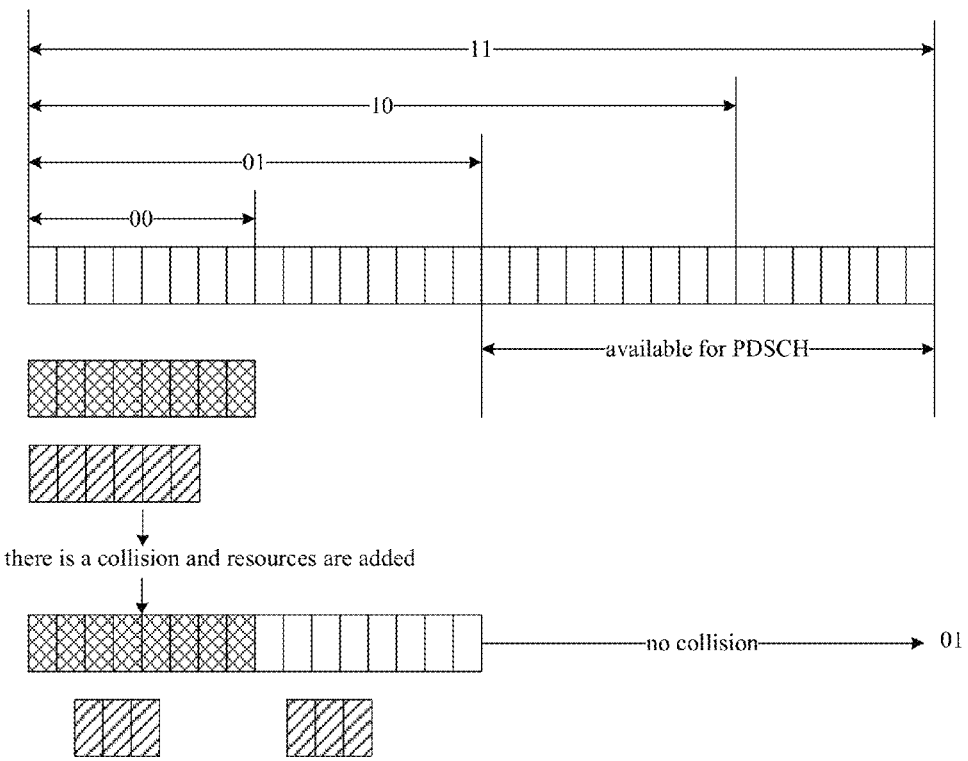
FIG. 8 shows a positive effect of search space partitioning Table 1, i.e., that the resource utilization efficiency is improved.

Such a partition mode can improve the resource utilization efficiency. For example, as shown in FIG. 8, the resources will be saved in this preferred embodiment as compared with the prior art as shown in FIG. 4.

To be specific, in the prior art, it is required to use the resources corresponding to the dynamic information 10 other than those corresponding to the dynamic information 10, while in this preferred embodiment, it is unnecessary to use these resources, and the resources corresponding to the dynamic information 10 other than those configured for ePDCCH may also be used for PDSCH transmission.

Figure 9:
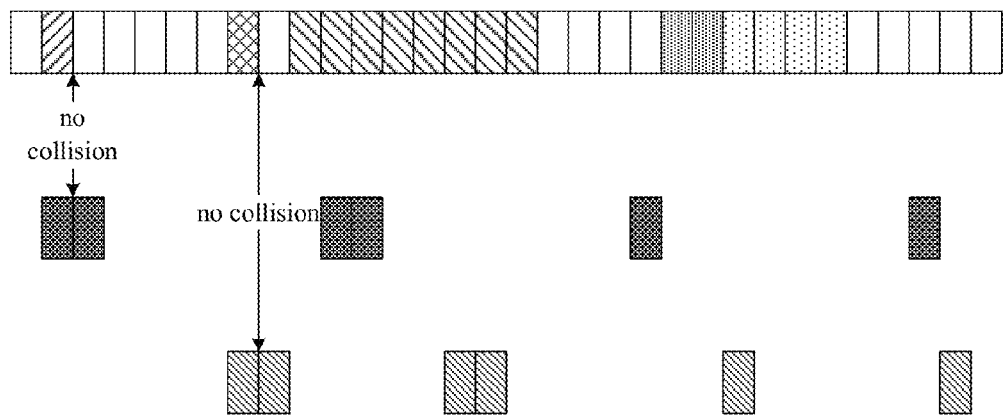
FIG. 9 shows another positive effect of search space partitioning Table 1, i.e., that the collision probability is reduced.

On the other hand, such a partition mode may further reduce the collision probability. To be specific, as shown in FIG. 5, when the base station allocates the search space for UE6 and UE7 in given resources with Hashing function in the prior art, the resources corresponding to the search space obtained with Hashing function are occupied, so the user control information of the UE cannot be transmitted. However, as shown in FIG. 9, when the partition mode of this preferred embodiment is used, the search space is dispersed to a plurality of resource subsets, so it is still able to configure ePDCCH for UE6 and UE7.

TABLE 2

Case 1 of the relationship between search space partition and the number of resources

| dynamic information | search space partition configuration | | | |
|---|---|---|---|---|
| 00 | aggregation level (CCE) | potential position number Set 1 | | |
| | 1 | 6 | | |
| | 2 | 6 | | |
| | 4 | 2 | | |
| | 8 | 2 | | |
| 01 | aggregation level (CCE) | potential position number | | |
| | | Set 1 | Set 2 | |
| | 1 | 3 | 3 | |
| | 2 | 3 | 3 | |
| | 4 | 1 | 1 | |
| | 8 | 1 | 1 | |
| 10 | aggregation level (CCE) | potential position level | | |
| | | Set 1 | Set 2 | Set 3 |
| | 1 | 2 | 2 | 2 |
| | 2 | 2 | 2 | 2 |
| | 4 | 1 | 0 | 1 |
| | 8 | 1 | 1 | 0 |
| 11 | aggregation level (CCE) | potential position number | | |
| | | Set 1 | Set 2 | Set 3 | Set 4 |
| | 1 | 2 | 2 | 1 | 1 |
| | 2 | 2 | 2 | 1 | 1 |
| | 4 | 1 | 0 | 0 | 1 |
| | 8 | 1 | 0 | 1 | 0 |

As can be seen in Table 2, in the case of a given number of resource subsets, the following information is actually recorded in Table 2: 1) the search space partition mode, i.e., the number of the potential search position subsets into which the current potential search position set is partitioned, and the number of the potential search position in each potential search position subset; and 2) the correspondence between the search position subset and the resource subset, i.e., the resource subset where the potential search position subset obtained by partitioning is located.

Step 703: in each subset, the searching space is allocated with Hashing function:

$$SS = L \times \{(Y_k + m) \bmod \odot N_{CCE\_set,k}/L\} + i,$$

wherein $L \in \{1,2,4,8\}$ represents the aggregation level, $i=0, \ldots, L-1$, $Y_k = (A \times Y_{k-1}) \bmod D$, $A=39827$, $D=65537$, $Y_{-1} = n_{RNTI} \neq 0$, $m=0, \ldots, M_L-1$, ML represents the potential position number corresponding to each aggregation level, and $N_{CCE\_set,k}$ represents a total number of CCEs in the subset.

Step 704: the user is informed of resource configuration information (Table 1) and search space partition information (Table 2) via a RRC signaling, or the information is embedded into the UE and the base station.

Figure 3:
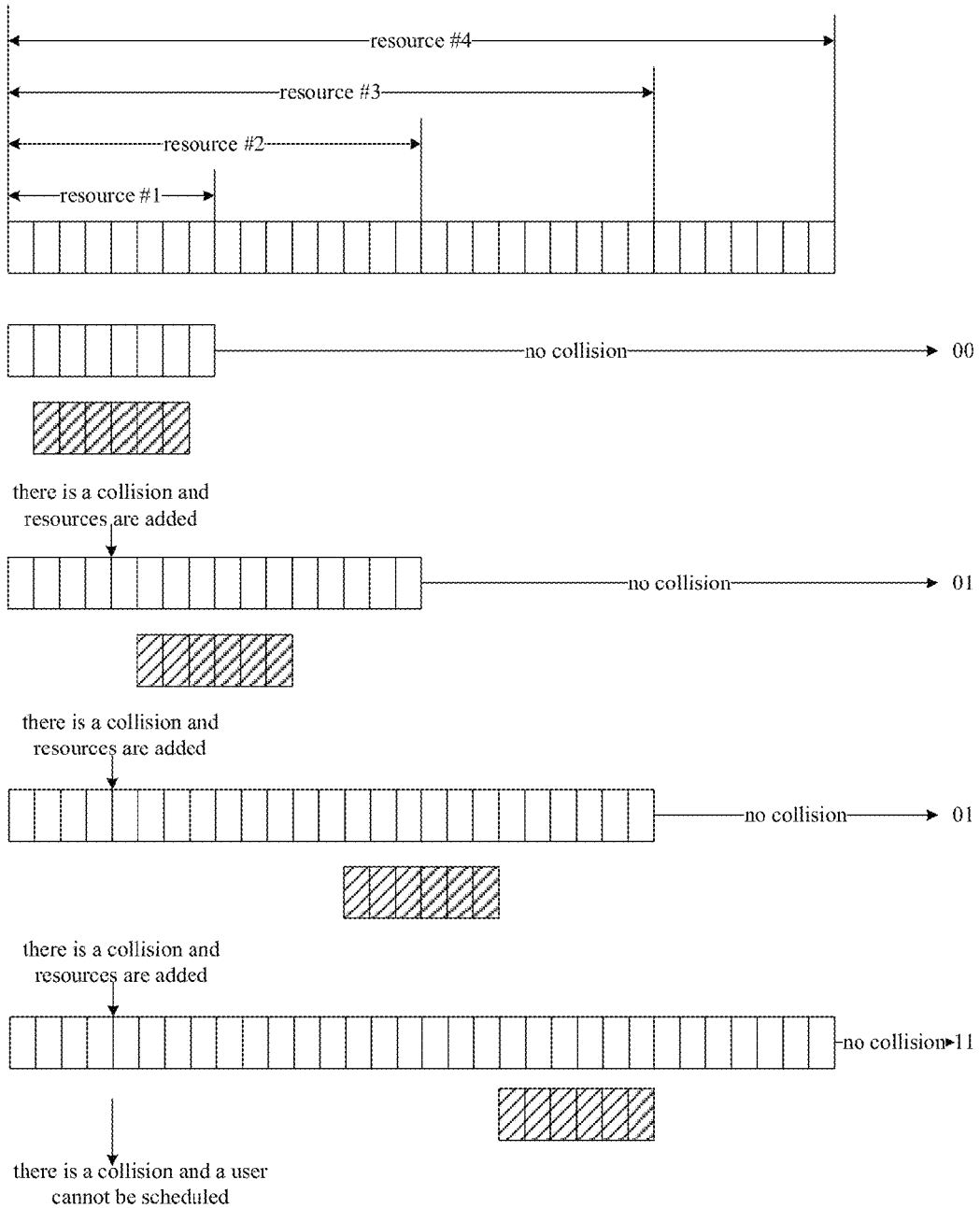
FIG. 3 is a schematic view showing a basic implementation mechanism of a method of dynamically informing resources.

It should be appreciated that, in the preferred embodiment of the present invention, although the resource partition mode as shown in Table 2, i.e., partitioning a specific resource into a certain number of resource subsets, may be used, the present invention is not limited thereto. Taking the condition as shown in FIG. 3 as an example, when resource #4 is used, resource #1 may constitute one resource subset, and a part of the resources in resource #2 other than resource #1 may constitute another resource subset, and the remaining resources may constitute yet another resource subset.

Alternatively, resource #2 may constitute a resource subset, and the resources in resource #4 other than resource #2 may constitute another resource subset.

All the above-mentioned partition modes can be used in the present invention, and these modes will not be listed herein.

The base station will implement the solution in the following steps.

Step A0: alternatively, the base station transmits the resource configuration information and the search space partition information in advance to the user via a RRC signaling. This step is merely required when the RRC signaling is used to transmit the information, and it is unnecessary when the information is embedded into the UE and the base station.

Step A1: the base station allocates the search space resource with Hashing function in resource 00 (resource #1) as shown in FIG. 7, and places the control information in the search space corresponding to the user. If there is no collision of the control information, the base station is ready to transmit dynamic information "00" to the user, and the procedure proceeds to Step A5. If there is a collision of the control information, the procedure proceeds to Step A2.

Step A2: the base station partitions resource 01 as shown in FIG. 6 into a corresponding number of subsets according to the resource configuration information, partitions the search space onto different subsets according to the search space partition information, allocates the search space resource with Hashing function, and places the control information in the search space corresponding to the user. If there is no collision of the control information, the base station is ready to transmit dynamic information "01" to the user, and the procedure proceeds to Step A5. If there is a collision of the control information, the procedure proceeds to Step A3.

Step A3: the base station partitions resource 10 as shown in FIG. 6 into a corresponding number of subsets according to the resource configuration information, partitions the search space on different subsets according to the search space partition information, allocates the search space resource with Hashing function, and places the control information in the search space corresponding to the user. If there is no collision of the control information, the base station is ready to transmit dynamic information "10" to the user, and the procedure proceeds to Step A5. If there is a collision of the control information, the procedure proceeds to Step A4.

Step A4: the base station partitions resource 11 as shown in FIG. 6 into a corresponding number of subsets according to the resource configuration information, partitions the search space on different subsets according to the search space partition information, allocates the search space resource with Hashing function, and places the control information in the search space corresponding to the user. If there is no collision of the control information, the base station is ready to transmit dynamic information "11" to the user, and the procedure proceeds to Step A5. If there is a collision of the control information, the collided user will not be scheduled, the base station is ready to transmit dynamic information "11" to the user, and the procedure proceeds to Step A5.

Step A5: the base station transmits, to the user, the control information of the user together with the dynamic information ready to be transmitted.

Correspondingly, the UE will implement the solution in the following steps.

Step B0: alternatively, the UE receives in advance the resource configuration information and the search space partition information. This step is merely required when the RRC signaling is used to transmit the information, and it is unnecessary when the information is embedded into the UE and the base station.

Step B1: the UE reads the dynamic information to acquire the number of resources for the ePDCCH transmission.

Step B2: the UE maps the dynamic information into the resource configuration table to acquire the number of the resources to be partitioned.

Step B3: the UE maps the dynamic information into the search space partition table to acquire the distribution of the search space in each subset.

Step B4: the UE determines the corresponding search space resource in each subset with Hashing function according to the information acquired in Step B3, and performs blind detection in the search space resource.

Second Preferred Embodiment

In the second preferred embodiment, the basic implementation mechanism is similar to that in the first preferred embodiment. The difference therebetween lies in the search space allocation modes. Correspondingly, the steps of this preferred embodiment and the steps executed by the base station and the UE are essentially the same as those of the first preferred embodiment, and the difference lies in the partition of the search space on different numbers of the resources in Step 702. To be specific, in the first preferred embodiment, the potential positions with the same aggregation level are partitioned on different subsets, while in this preferred embodiment, the potential positions with different aggregation levels are partitioned on different subsets, and the potential positions with the same aggregation level correspond to the same subset. As shown in Table 3, taking that the dynamic information is 01 as an example, there are two subsets, i.e., Set 1 and Set 2, the potential positions corresponding to aggregation levels 1 and 2 correspond to subset Set 1, and the potential positions corresponding to aggregation levels 4 and 8 correspond to subset Set 2.

Figure 10:
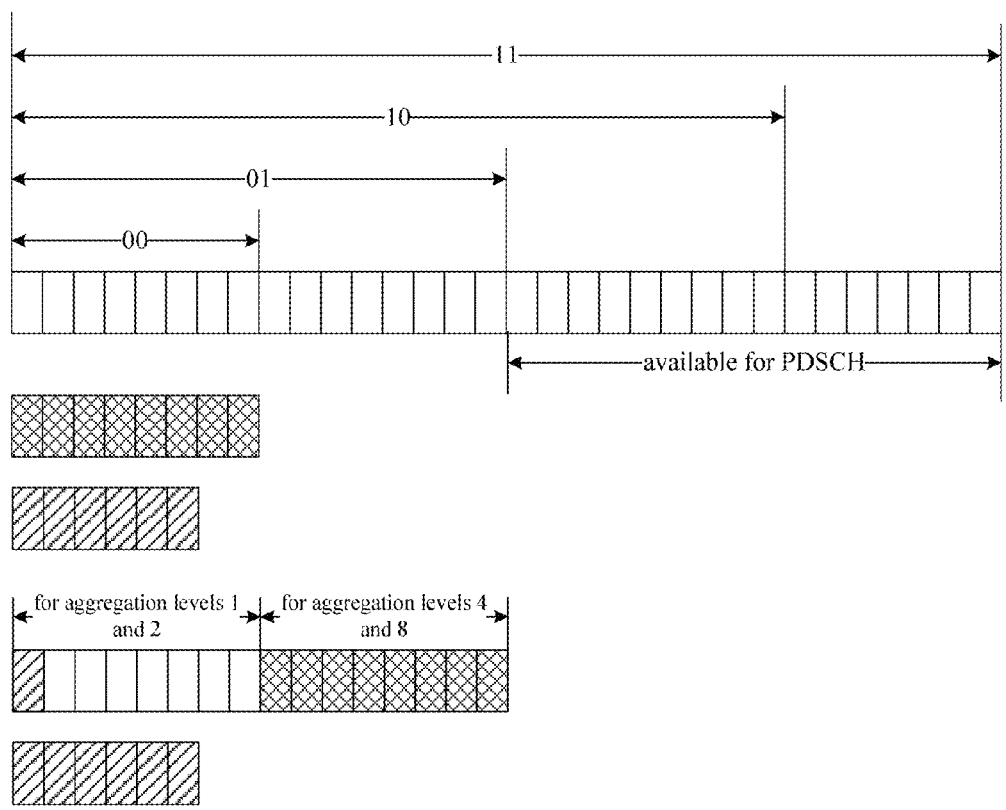
FIG. 10 shows a positive effect of search space partitioning Table 2, i.e., that the resource utilization efficiency is improved.

The use of such a mode of partitioning the resources for the search space allocation can improve the resource utilization efficiency. For example, as shown in FIG. 10, resource #1 constitutes one resource subset and the UE with the control information of a small size corresponds to this resource subset. The resources in resource #2 other than resource #1 correspond to the other resource subset, and the UE with the control information of a large size is arranged in this resource subset. The other resource subset is allocated for UE1, and the one resource subset is allocated for UE2. As a result, it is unnecessary to use a third resource subset (the resources in resource #3 other than resource #2), just like that in the prior art, thereby it is able to save the resources.

Figure 11:
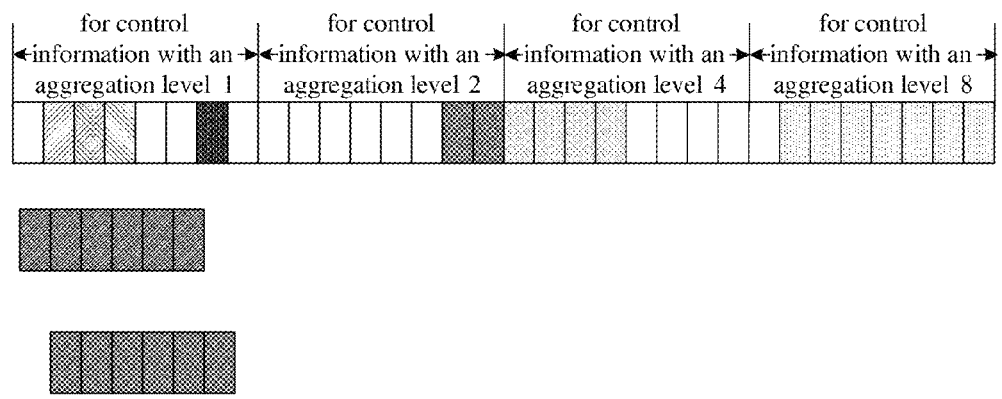
FIG. 11 shows another positive effect of search space partitioning Table 2, i.e., that the collision probability is reduced.

On the other hand, the use of such a mode of partitioning the resources for the search space allocation can also reduce the collision probability. For example, as shown in FIG. 11, UE 6 and UE 7 both correspond to the control information of a small size, and resource subsets corresponding thereto are different from those allocated for the control information with a large size. As a result, it is able to prevent the collision in the prior art when the control information with a large size is arranged in the first resource subset.

TABLE 3

Case 2 of the relationship between search space partition and the number of resources

| dynamic information | Search space partition configuration | | | |
|---|---|---|---|---|
| 00 | aggregation level | potential position number Set 1 | | |
| | 1 | 6 | | |
| | 2 | 6 | | |
| | 4 | 2 | | |
| | 8 | 2 | | |
| 01 | aggregation level | potential position number | | |
| | | Set 1 | Set 2 | |
| | 1 | 6 | 0 | |
| | 2 | 6 | 0 | |
| | 4 | 0 | 2 | |
| | 8 | 0 | 2 | |
| 10 | aggregation level | potential position number | | |
| | | Set 1 | Set 2 | Set 3 |
| | 1 | 6 | 0 | 0 |
| | 2 | 0 | 6 | 0 |
| | 4 | 0 | 0 | 2 |
| | 8 | 0 | 0 | 2 |
| 11 | aggregation level | potential position number | | | |
| | | Set 1 | Set 2 | Set 3 | Set 4 |
| | 1 | 6 | 0 | 0 | 0 |
| | 2 | 0 | 6 | 0 | 0 |
| | 4 | 0 | 0 | 2 | 0 |
| | 8 | 0 | 0 | 0 | 2 |

Figure 12:
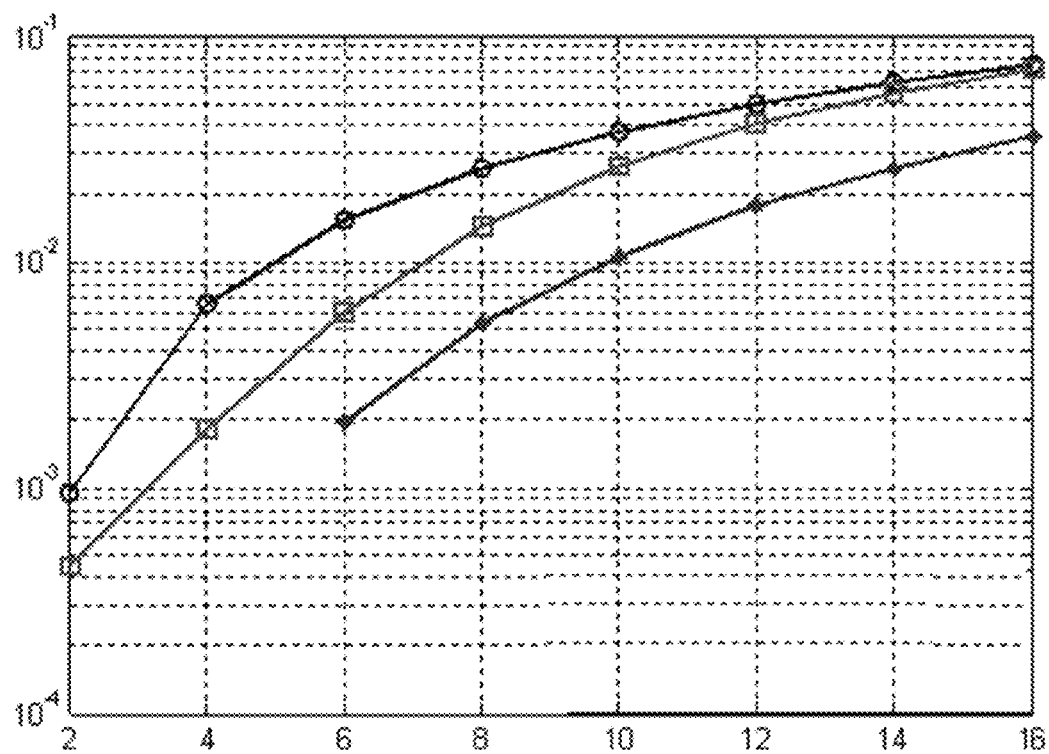
FIG. 12 shows the comparison between the collision probabilities.
Figure 13:
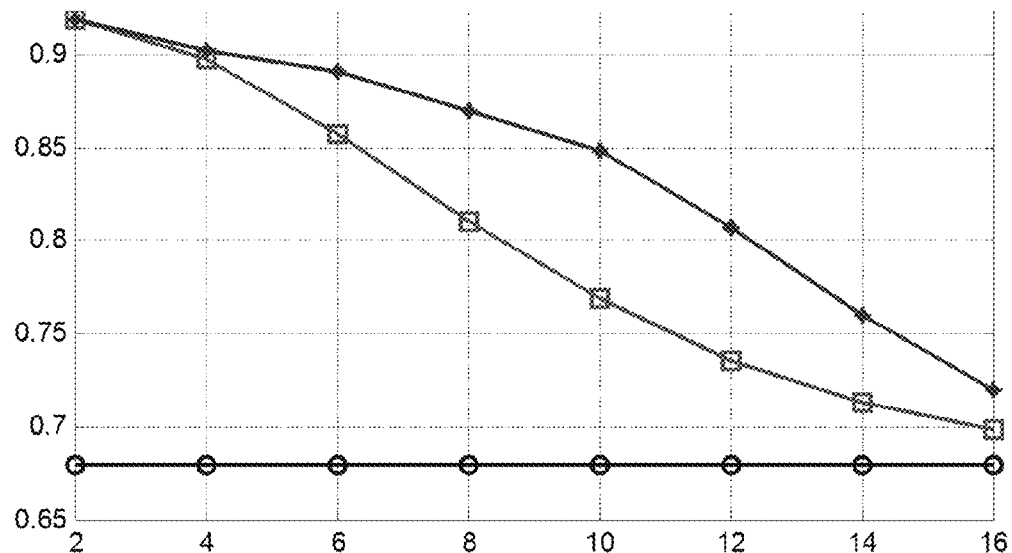
FIG. 13 shows the resource utilization efficiency comparison between the proposed method and traditional methods.

Table 4 shows the stimulation parameter configurations according to the first preferred embodiment of the present invention, and stimulation results of the collision probability and the resource utilization efficiency may be obtained from Table 4. FIG. 12 shows the stimulation results of the collision probability, with a horizontal axis for the user number and a vertical axis for the collision probability. FIG. 13 shows the stimulation results of the resource utilization efficiency, with a horizontal axis for the user number and a vertical axis for the resource utilization efficiency.

The curve with circles corresponds to an existing scheme for allocating the search space with Hashing function in all the ePDCCH domains, the curve with blocks corresponds an existing scheme for allocating the search space successively, and the remaining curve corresponds to the scheme for allocating the search space and the resources in the embodiments of the present invention.

It can therefore be seen that, the collision probability obtained according to the preferred embodiments of the present invention is smaller than that obtained according to the two existing technologies mentioned in the background, and the resource utilization efficiency obtained according to the preferred embodiments of the present invention is greater than that obtained according to the two existing technologies mentioned in the background.

TABLE 4

| parameter | value |
| --- | --- |
| the maximum number of UEs | 16 |
| the number of PRB pairs for ePDCCH | 16 |
| the number of UEs to be scheduled | [2, 4, 6, 8, 10, 12, 14, 16] |
| aggregation level (AL) | [1, 2, 4, 8] |
| distribution of AL | [60%, 20%, 15%, 5%] |
| bandwidth | 10 MHz (50 RBs) |

An embodiment of the present invention further provides an information transmission apparatus for enabling a base station to transmit first user control information of a first user on an Enhanced physical downlink control channel (ePDCCH), the information transmission apparatus comprising:

an allocation module configured to, according to a search space allocation mode, perform a search space allocation in a target resource consisting of at least two resource subsets, and allocate, for the first user, a first search space capable of transmitting the first user control information, the search space allocation mode being associated with the at least two resource subsets; and a first transmission module configured to transmit the first user control information via the first search space so that the first user can acquire the first user control information from the first search space according to the search space allocation mode.

Hence, according to the search space allocation mode, the search space is allocated for the user in the target resource consisting at least two resource subsets, and the corresponding user control information is transmitted via the allocated search space. As a result, a new method for allocating the search space is provided.

The allocation module specifically comprises:

a pre-allocation unit configured to, according to the search space allocation mode, perform the search space allocation in a current target resource consisting of at least two resource subsets, to obtain an allocation result;

a judgment unit configured to, according to the allocation result, judge whether or not the first search space currently allocated for the first user can transmit the first user control information, to obtain a judgment result; and an execution unit configured to, when the judgment result is yes, trigger the first transmission module to transmit the first user control information, and otherwise update the current target resource by allocating new resources from the unallocated resources as new resource subsets, and then trigger the pre-allocation unit to perform the search space allocation.

To be specific, based on different search space allocation modes, the information transmission apparatus may be implemented in the following ways.

In case of that the correspondence between the resource subset and a size of the user control information is recorded in the search space allocation mode, the pre-allocation unit specifically comprises:

a determination sub-unit configured to, according to the correspondence between the resource subset and the size of the user control information, determine a first resource subset corresponding to a size of the first user control information from the at least two resource subsets; and an acquisition sub-unit configured to perform the search space allocation in the first resource subset, to obtain the allocation result.

Alternatively, in case of that the search space allocation mode includes a search space partitioning mode as well as a correspondence between a search position subset and a resource subset, the pre-allocation unit specifically comprises:

a partition sub-unit configured to, according to the search space partitioning mode, partition a current potential search position set into a plurality of first potential search position subsets;

a selection sub-unit configured to, according to the correspondence between the search position subset and the resource subset, select the first resource subsets corresponding to the first potential search position subsets from the current target resource;

an allocation sub-unit configured to perform the allocation in the first resource subsets respectively, to obtain a first search subspace corresponding to each of the first resource subsets; and a combining sub-unit configured to combine all the first search subspaces into the allocation result.

Further, the information transmission apparatus may comprise:

a second transmission module configured to acquire the search space allocation mode used when the base station allocates the first search space, and inform the first user of the search space allocation mode.

The present invention further provides a base station comprising the above-mentioned information transmission apparatus.

The above are merely the preferred embodiments of the present invention. It should be noted that, a person skilled in the art may make improvements and modifications without departing from the principle of the present invention, and these improvements and modifications shall also be considered as the scope of the present invention.

What is claimed is:

1. An information transmission method comprising:
an allocation step of, according to a search space allocation mode, performing, by a base station, a search space allocation in a target resource comprising at least two resource subsets and allocating, for a first user, a first enhanced physical downlink control channel (EPDCCH) search space capable of transmitting first user control information of the first user, the search space allocation mode being associated with the at least two resource subsets; and
a first transmission step of transmitting, by the base station, the first user control information via the first EPDCCH search space to the first user so that the first user can acquire the first user control information from the first EPDCCH search space according to the search space allocation mode;
wherein the search space allocation mode is one of a first search space allocation mode and a second search space allocation mode; the first search space allocation mode includes a search space partitioning mode as well as a correspondence between a search position subset and a resource subset; the second search space allocation mode records a correspondence between the resource subset and a size of the user control information;
wherein configured potential resource for EPDCCH transmission is partitioned into several parts and each of the parts is called one resource subset.

2. The information transmission method according to claim 1, wherein the allocation step comprises:
a pre-allocation step of, according to the search space allocation mode, performing, by the base station, the search space allocation in a current target resource comprising at least two resource subsets, to obtain an allocation result;

a judgment step of, according to the allocation result, judging, by the base station, whether or not the first EPDCCH search space currently allocated for the first user can transmit the first user control information, to obtain a judgment result; and an execution step of, when the judgment result is yes, proceeding to the first transmission step, and otherwise updating the current target resource by allocating new resources from the unallocated resources as new resource subsets, and then performing the search space allocation again.

3. The information transmission method according to claim 2, wherein when selecting the second search space allocation mode as the search space allocation mode, and the pre-allocation step comprises:

according to the correspondence between the resource subset and the size of the user control information, determining, by the base station, a first resource subset corresponding to a size of the first user control information from the at least two resource subsets; and performing, by the base station, the search space allocation in the first resource subset, to obtain the allocation result.

4. The information transmission method according to claim 2, wherein when selecting the first search space allocation mode as the search space allocation mode, and the pre-allocation step comprises:

according to the search space partitioning mode, partitioning, by the base station, a current potential search position set into a plurality of first potential search position subsets;

according to the correspondence between the search position subset and the resource subset, selecting, by the base station, the first resource subsets corresponding to the first potential search position subsets from the current target resource;

performing, by the base station, the allocation in the first resource subsets respectively, to obtain a first EPDCCH search subspace corresponding to each of the first resource subsets; and combining, by the base station, all the first EPDCCH search subspaces into the allocation result.

5. The information transmission method according to claim 4, wherein the number of the EPDCCH search subspaces is less than or equal to the number of the selected resource subsets.

6. The information transmission method according to claim 2, wherein in the judgment step, the judging, by the base station, whether or not the first EPDCCH search space currently allocated for the first user can transmit the first user control information comprises:

judging whether or not there is collision of the first user control information at all potential positions to transmit the first user control information in the first EPDCCH search space currently allocated for the first user.

7. The information transmission method according to claim 1, wherein the search space allocation mode is pre-stored in the base station and a user equipment (UE).

8. The information transmission method according to claim 1, further comprising:

a second transmission step of acquiring the search space allocation mode used when the base station allocates the first EPDCCH search space, and informing the first user of the search space allocation mode.

9. The information transmission method according to claim 8, wherein in the second transmission step, the first user is informed of the search space allocation mode via a RRC signaling.

10. The information transmission method according to claim 1, wherein the search space allocation mode is changed with dynamic change of configuration of the at least two resource subsets.

11. The information transmission method according to claim 1, wherein according to the first search space allocation mode, potential search positions with same aggregation level are partitioned on different resource subsets; according to the second search space allocation mode, potential search positions with different aggregation levels are partitioned on different resource subsets, and potential search positions with the same aggregation level correspond to same subset.

12. An information transmission apparatus comprising:

an allocation circuit configured to, according to a search space allocation mode, perform a search space allocation in a target resource comprising at least two resource subsets and allocate, for a first user, a first enhanced physical downlink control channel (EPDCCH) search space capable of transmitting first user control information of the first user, the search space allocation mode being associated with the at least two resource subsets; and a first transmission circuit configured to transmit the first user control information from a base station via the first EPDCCH search space to the first user so that the first user can acquire the first user control information from the first EPDCCH search space according to the search space allocation mode;

wherein the search space allocation mode is one of a first search space allocation mode and a second search space allocation mode; the first search space allocation mode includes a search space partitioning mode as well as a correspondence between a search position subset and a resource subset; the second search space allocation mode records a correspondence between the resource subset and a size of the user control information;

wherein configured potential resource for EPDCCH transmission is partitioned into several parts and each of the parts is called one resource subset.

13. The information transmission apparatus according to claim 12, wherein the allocation circuit comprises:

a pre-allocation circuit configured to, according to the search space allocation mode, perform the search space allocation in a current target resource comprising at least two resource subsets, to obtain an allocation result;

a judgment circuit configured to, according to the allocation result, judge whether or not the first EPDCCH search space currently allocated for the first user can transmit the first user control information, to obtain a judgment result; and an execution circuit configured to, when the judgment result is yes, trigger the first transmission circuit to transmit the first user control information, and otherwise update the current target resource by allocating new resources from the unallocated resources as new resource subsets, and then trigger the pre-allocation circuit to perform the search space allocation.

14. The information transmission apparatus according to claim 13, wherein when selecting the second search space allocation mode as the search space allocation mode, and the pre-allocation circuit comprises:

a determination sub-circuit configured to, according to the correspondence between the resource subset and the size of the user control information, determine a first resource subset corresponding to a size of the first user control information from the at least two resource subsets; and an acquisition sub-circuit configured to perform the search space allocation in the first resource subset, to obtain the allocation result.

15. The information transmission apparatus according to claim 13, wherein when selecting the first search space allocation mode as the search space allocation mode, and the pre-allocation circuit comprises:

a partition sub-circuit configured to, according to the search space partitioning mode, partition a current potential search position set into a plurality of first potential search position subsets;

a selection sub-circuit configured to, according to the correspondence between the search position subset and the resource subset, select the first resource subset corresponding to the first potential search position subsets from the current target resource;

an allocation sub-circuit configured to perform the allocation in the first resource subsets respectively, to obtain a first EPDCCH search subspace corresponding to each of the first resource subsets; and a combining sub-circuit configured to combine all the EPDCCH first search subspaces into the allocation result.

16. The information transmission apparatus according to claim 13, wherein the judgment circuit is further configured to, according to the allocation result, judge whether or not there is collision of the first user control information at all potential positions to transmit the first user control information in the first EPDCCH search space currently allocated for the first user so as to judge whether or not the first EPDCCH search space currently allocated for the first user can transmit the first user control information, to obtain a judgment result.

17. The information transmission apparatus according to claim 12, further comprising:

a second transmission circuit configured to acquire the search space allocation mode used when the base station allocates the first EPDCCH search space, and inform the first user of the search space allocation mode.

18. A base station comprising the information transmission apparatus according to any one of claims 12 to 17.

19. The information transmission apparatus according to claim 12, wherein the search space allocation mode is changed with dynamic change of configuration of the at least two resource subsets.

20. The information transmission apparatus according to claim 12, wherein according to the first search space allocation mode, potential search positions with same aggregation level are partitioned on different resource subsets; according to the second search space allocation mode, potential search positions with different aggregation levels are partitioned on different resource subsets, and potential search positions with the same aggregation level correspond to same subset.

* * * * *